(12) United States Patent
Kluit

(10) Patent No.: US 9,987,573 B2
(45) Date of Patent: Jun. 5, 2018

(54) INTERNALLY FED DRUM FILTER FOR TREATING WASTE WATER COMPRISING AN INLET DISTRIBUTION ARRANGEMENT

(71) Applicant: NIJHUIS WATER TECHNOLOGY B.V., Doetinchem (NL)

(72) Inventor: Arie Kluit, Doetinchem (NL)

(73) Assignee: NIJHUIS WATER TECHNOLOGY B.V., Doetinchem (NL)

( * ) Notice: Subject to any disclaimer, the term of this patent is extended or adjusted under 35 U.S.C. 154(b) by 420 days.

(21) Appl. No.: 14/415,760

(22) PCT Filed: Jul. 12, 2013

(86) PCT No.: PCT/NL2013/050526
§ 371 (c)(1),
(2) Date: Jan. 20, 2015

(87) PCT Pub. No.: WO2014/014345
PCT Pub. Date: Jan. 23, 2014

(65) Prior Publication Data
US 2015/0174512 A1 Jun. 25, 2015

(30) Foreign Application Priority Data
Jul. 20, 2012 (NL) ..................................... 2009216

(51) Int. Cl.
*B01D 33/00* (2006.01)
*B01D 33/70* (2006.01)
(Continued)

(52) U.S. Cl.
CPC ............ *B01D 33/11* (2013.01); *B01D 33/648* (2013.01); *B01D 33/722* (2013.01); *B01D 35/1573* (2013.01); *C02F 1/001* (2013.01)

(58) Field of Classification Search
CPC .... B01D 33/06; B01D 33/11; B01D 33/0003; B01D 33/0006; B01D 33/0009;
(Continued)

(56) References Cited

U.S. PATENT DOCUMENTS 3,275,150 A    9/1966  Tait
3,864,107 A *  2/1975  Baigas, Jr. ............. B01D 50/00
                                                         55/290
(Continued)

FOREIGN PATENT DOCUMENTS

DE          1611122 B1      2/1972
WO          8400311 A1      2/1984
WO       2011161327 A1     12/2011

OTHER PUBLICATIONS

International Search Report, dated Oct. 9, 2013, from corresponding PCT application.

Primary Examiner — Claire A Norris
Assistant Examiner — Julia L. Wun
(74) Attorney, Agent, or Firm — Young & Thompson

(57) ABSTRACT

An internally fed drum filter for treating waste water, includes an inlet distribution arrangement for distributing waste water entering the drum filter via an inlet duct, characterized in that the inlet distribution arrangement includes an adjustable flow deflection member arranged near the outflow opening of the inlet duct, downstream thereof, for adjusting the flow characteristics of waste water entering the drum filter via the inlet duct.

17 Claims, 3 Drawing Sheets

(51) Int. Cl.
    *C02F 1/00*     (2006.01)
    *B01D 33/11*     (2006.01)
    *B01D 35/157*     (2006.01)
    *B01D 33/64*     (2006.01)
    *B01D 33/72*     (2006.01)

(58) Field of Classification Search
    CPC ...... B01D 33/72; B01D 33/722; B01D 33/62; B01D 33/64; B01D 33/648; B01D 35/1573; B01D 35/157; C02F 1/001; C02F 11/126; C02F 11/12; C02F 11/121
    USPC ................ 210/403, 402, 784, 780, 418, 420
    See application file for complete search history.

(56) References Cited

U.S. PATENT DOCUMENTS

| | | |
|---|---|---|
| 5,133,860 A | 7/1992 | Tai |
| 2004/0118768 A1* | 6/2004 | Lynn ...................... B01D 33/04 210/456 |

\* cited by examiner

INTERNALLY FED DRUM FILTER FOR TREATING WASTE WATER COMPRISING AN INLET DISTRIBUTION ARRANGEMENT

FIELD OF THE INVENTION

The invention relates to an in internally fed drum filter for treating waste water, comprising an inlet distribution arrangement for distributing waste water entering the drum filter via an inlet duct.

BACKGROUND OF THE INVENTION

The first step in the treatment of waste water is the removal of coarse solids, such as chunks of hard soil, in order to prevent these solids from damaging piping or other equipment further on in the treatment process. The removal of solids is for example effected by placing screens in the waste water stream to be treated, or by installing cloth filters. Another method of removing these solids is by feeding the waste water into a so-called internally fed drum filter.

The use of internally fed drum filters for separating solid substances from fluids is known from for example U.S. Pat. No. 3,275,150, which describes a rotary drum filter for the thickening of e.g. fluids as used in the manufacturing of paper. The described apparatus comprises a drum revolving in a tank containing e.g. paper pulp stock. The fluid is drained away and thickened paper slurry is processed further to produce paper. When treating waste water the opposite is true, i.e. that the fluid is processed further whereas the solid substances are removed.

Another internally fed drum filter is known from WO2011161327. This publication describes a process for treating waste water comprising organic material, such as waste water originating from a food industry plant, wherein waste water is led through a first purification phase comprising a drum screen, for separating the coarsest solid debris from the waste water.

An internally fed drum filter generally comprises a water-permeable drum that is rotatable in a casing and an inlet duct that discharges e.g. waste water inside the drum filter. The inner surface of the drum filter is provided with a spiral that due to rotation of the drum enables solid substances present in the waste water to be pushed towards the end of the drum filter opposing the inlet duct end in order to be removed. At the same time the permeability of the drum enables water to leave the drum filter via the circular drum wall for receiving further treatment.

However, a disadvantage is that the inlet areas of these drum filters are prone to clogging. Therefore, it has been proposed in the prior art to incorporate an inlet distributor into the filter design. These inlet distributors are generally of the "headbox" type. A headbox is a type of shallow water reservoir connected to the inlet pipe, that allows waste water to flow over the edges of the reservoir, whereas the solid substances remain in the reservoir to be discharged evenly to the drum filter via the bottom of the reservoir.

These headbox type inlet distributors have several disadvantages. A first disadvantage is that debris may build up inside the reservoir, causing the headbox itself to clog. Another disadvantage is that foul water may be retained in the reservoir, especially during low supply rates of waste water via the inlet duct, causing fouling of the reservoir and causing it to generate a rather unpleasant smell. A further disadvantage is that the flow characteristics of the flow of waste water entering the drum filter via the inlet duct can not be adjusted, e.g. the flow velocity of the incoming waste water can not be regulated in any way.

Therefore, it is an object of the invention to provide an inlet distribution arrangement for an internally fed drum filter, wherein the flow characteristics of the waste water entering the drum filter via the inlet duct can be adjusted.

SUMMARY OF THE INVENTION

This object is achieved by providing an internally fed drum filter, wherein the inlet distribution arrangement comprises an adjustable flow deflection member arranged near the outflow opening of the inlet duct, downstream thereof, for adjusting the flow characteristics of waste water entering the drum filter via the inlet duct.

The adjustable deflection member allows control of the flow characteristics of the waste water entering the drum filter via the inlet duct. Especially flow velocity and direction can be adjusted with the help of the deflection member. The absence of a headbox furthermore prevents the stalling of foul, smelly waste water, or clogging of the headbox.

An embodiment relates to a drum filter, wherein the orientation and/or position of the flow deflection member can be adjusted in such a way, that the flow deflection member is upwardly inclined. By putting the flow deflection member in an upwardly inclined direction it is prevented that the waste water and solid substances present therein primarily collect below the outflow opening of the inlet duct.

A further embodiment relates to a drum filter, wherein the angle of an upwardly inclined flow deflection member with respect to the plane coinciding with the outflow opening can be adjusted within the range of 40°-85°, corresponding to a range of 5°-50° with respect to the centre line of the inlet duct, when the plane of the outflow opening is perpendicular to the centre line. In practice, such an angle yields an optimal result with respect to preventing collection of substances below the outflow opening.

Another embodiment concerns a drum filter, wherein an end of the flow deflection member is hingeably connected to a lower part of the circumference of the outflow opening. The lower part of the circumference is very suitable for hingeably connecting the flow deflection member, because the flow deflection member can be rotated into and out of the incoming waste water stream relatively easily. Furthermore, the efficiency of the flow deflection member is increased, since the waste water will have a natural tendency to 'fall' onto the flow deflection member, due to gravity.

A further advantageous embodiment comprises a drum filter, wherein the orientation and/or position of the flow deflection member can be adjusted in such a way, that the incoming flow is essentially divided into two flows directed at the sides of the drum filter. An even better distribution of incoming waste water over the drum filter surface is achieved by doing so.

Another embodiment relates to a drum filter wherein the flow deflection member has a bent or curved flow deflection surface in a plane perpendicular to a longitudinal direction of the flow deflection member, wherein the convex side of the bent or curved surface is facing the outflow opening. The curved or bent surface aids in deflecting the incoming flow in the desired directions.

A further embodiment concerns a drum filter wherein the flow deflection member is a plate. A plate is relatively easy to deform in order to give the flow deflection member the desired flow deflection characteristics.

In a preferred embodiment the deflection member has a V-shaped cross-section resulting in the deflection member to have a sharp edge and two flanges connecting in the sharp edge, wherein the sharp edge of the V-shaped section substantially faces the outflow opening. Such a V-shaped member is very efficient for directing the incoming flow sideways. In this respect, "flange" means a substantially flat shape suitable for deflecting the incoming flow.

Adjustment of the flow deflection member can be achieved by moving one or more actuators connected to the deflection member, wherein the one or more actuators can be activated by being connected to activation means situated outside the inlet end of the drum filter. Thus, the deflection member can be operated from outside the drum filter by the activation means, preventing the activation means from being exposed to the waste water.

In a further embodiment the one or more actuators are substantially arranged close to the underside of the inlet duct and extend parallel thereto. Thus, the one or more actuators are minimally exposed to incoming waste water, preventing wear of the actuators while allowing them to effectively control the position and/or orientation of the flow deflection member.

The one or more actuators preferably comprise a rod and/or a thread. Such a rod or thread has a very high mechanical reliability in hostile environments such as the inside of a drum filter for treating waste water. Compressive or tensile forces can also be easily transmitted to the deflection member for changing its position and/or orientation. For providing optimal control of the flow deflection member, a plurality of rods and/or threads is preferably used, the rods and/or threads being attached to different locations on the flow deflection member.

An embodiment relates to a drum filter, wherein the acute angle of the flanges of the V-shaped member is 80°-160°, preferably around 120°. Thus, an optimal flow distribution towards the sides of the drum filter is achieved.

In practice, an even better flow distribution is achieved by providing a drum filter, wherein the flange width of the V-shaped deflection member increases along the length thereof (also known as "tapering"). This increase of flange width in length direction may relate to both directions, i.e. an increase in one direction or an increase in the opposite direction may be desired depending on the required flow characteristics.

BRIEF DESCRIPTION OF THE DRAWINGS

An embodiment of a drum filter according to the invention will by way of non-limiting example be described in detail with reference to the accompanying drawings. In the drawings.

DETAILED DESCRIPTION OF THE INVENTION

Figure 1:
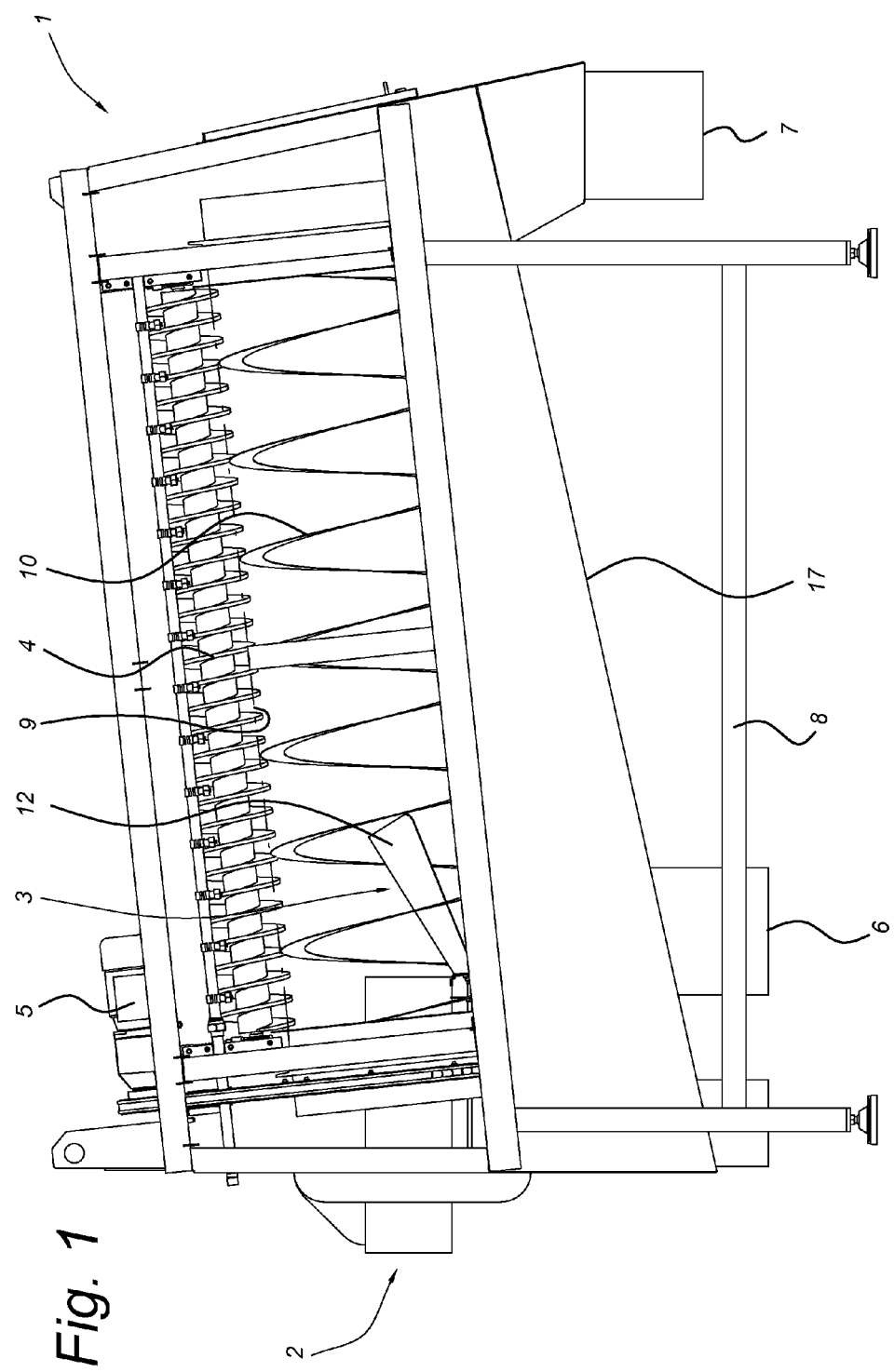
FIG. 1 shows a schematic side view of the internally fed drum filter according to the invention.

FIG. 1 shows an internally fed drum filter 1 in side view. The cylindrical, rotatable drum itself is not shown to increase clarity. The left part of FIG. 1 shows an inlet duct 2 for supplying waste water to be treated by the drum filter 1 to the inside of the drum cylinder. In the lower part of FIG. 1 an inclined collection tray 17 for collecting filtered waste water is shown. The degree of inclination has been chosen such that filtered waste water flows toward the filtered waste water discharge 6. The collection tray 17 is supported by a support frame 8, which can be any suitable kind of frame. The right part of FIG. 1 shows a solid substance discharge 7 for removing filtered-out solid substances from the drum filter 1. The inside of the drum cylinder is provided with a helicoid 10 for facilitating the transport of solid substances towards the solid substance discharge 7 when the drum rotates. Above the drum cylinder a brush 4 is situated for brushing solid particles out of the relatively small filtering holes of the drum cylinder in order to keep the drum cylinder water-permeable. Furthermore, a drive motor 5 is shown for rotating the drum cylinder. To the right of the outflow opening of the inlet duct 2 the inlet distribution arrangement 3 according to the invention is shown, comprising the adjustable flow deflection member 12. The functioning of the inlet distribution arrangement 3 will be explained further with reference to FIG. 2.

When waste water to be treated enters the drum filter 1 via the inlet duct 2 it flows onto the flow deflection member 3, which alters the characteristics of the incoming flow, such that an improved distribution of the waste water, and especially solid substances present therein, over the drum cylinder is achieved.

Figure 2:
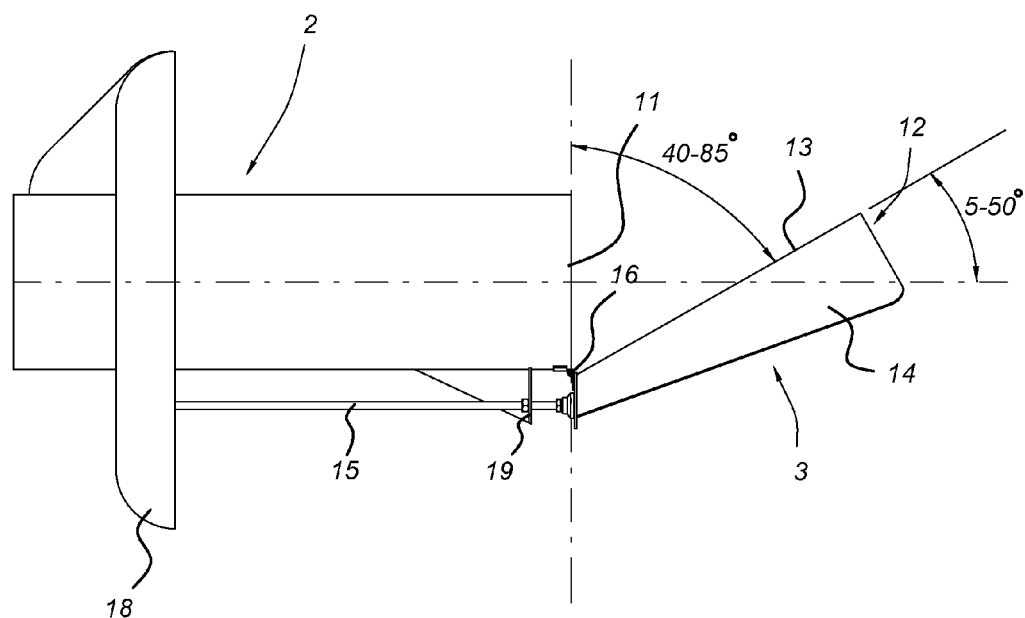
FIG. 2 shows a close-up side view of the inlet distribution arrangement according to the invention.

FIG. 2 shows a close-up view of the inlet distribution arrangement 3 comprising the flow deflection member 12 according to the invention. The flow deflection member 12 is connected to the underside of the inlet duct 2 by means of a hinge 16, that allows rotation of the flow deflection member 12 from and towards the outflow opening 11 of the inlet duct 2. This rotation can be effected by displacing an actuating rod 15 connected to a flange of the flow deflection member 12 from left to right and vice versa. To this end activation means (not shown) are to be positioned outside the drum cylinder, i.e. left of the separation wall 18. The rod 15 projects through this separation wall 18. Although a single rod 15 is discussed here, multiple rods, threads or similar force transmission means can be used. The rod 15 can be conveniently positioned just below the inlet duct 2 and parallel thereto. The rod 15 can furthermore be supported by an intermediate rod support 19 arranged on the underside of the inlet duct 2. Thus, the rod 15 is shielded as much as possible from the waste water flowing out of the outflow opening 11. Operation of the rod 15 can be achieved in an automated fashion, for example by using electric, hydraulic or pneumatic activation means. The activation means preferably automatically adapt the angle of the flow deflection member 12, for example based on the water level in the drum filter 1. The rod 15 can also be provided with a screw thread, such that it is moveable in a length direction by rotation thereof, the rotating movement being provided by the activation means.

The flow deflection member 12 preferably has a V-shaped cross-section. The flow deflection member 12 (thus) has a sharp edge 13 at the intersection of two flanges 14. The sharp edge 13 is preferably turned towards the outflow opening, the sharp edge 13 splitting or diverting the incoming flow along its length into two flows directed towards the internal surface of the drum cylinder for obtaining a better flow distribution. The rotational angle of the sharp edge 13 of the flow deflection member 12 with respect to the plane coinciding with the outflow opening 11 preferably lies within the range of 40°-85°, corresponding to a range of 5°-50° with respect to the centre line of the inlet duct 2 (as shown in FIG. 2), when the plane of the outflow opening 11 is perpendicular to the centre line. Other rotational angles are also conceivable, since a preferred range of angles is shown in FIG. 2.

Figure 3A:
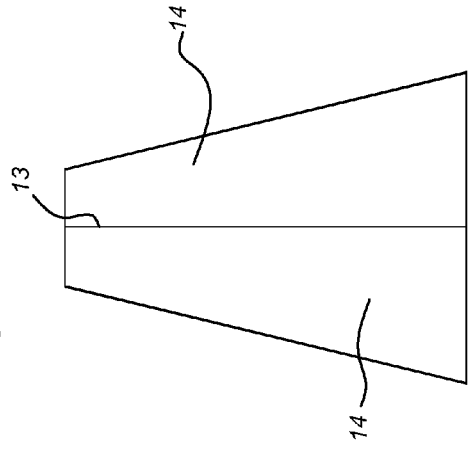
FIGS. 3a-3c show various possible shapes for the V-shaped flow deflection member.
Figure 3B:
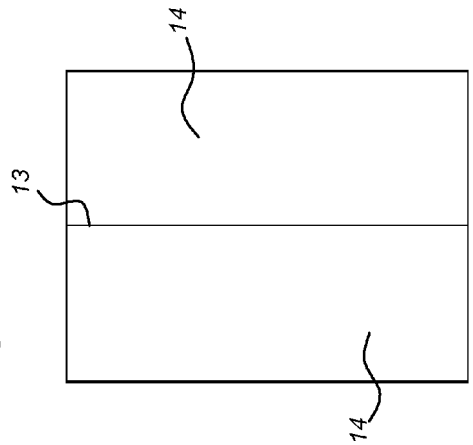
Figure 3C:
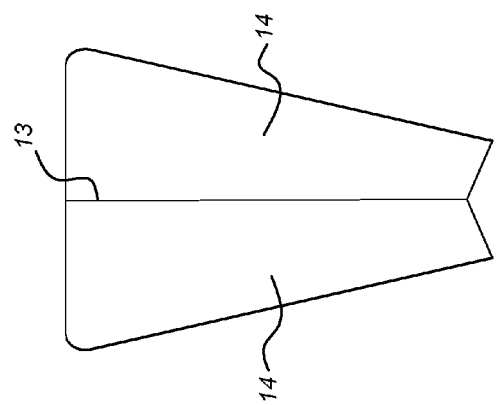
Figure 3D:
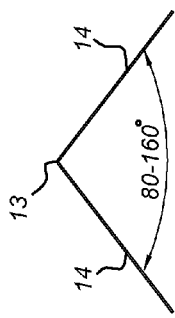
FIG. 3d shows a cross-section of the flow deflection member.

FIGS. 3a-3c show various possible shapes for the V-shaped flow deflection member. FIG. 3a shows a top view of a first shape wherein the width of the flanges 14 increases along the length of the flow deflection member 12. In contrast thereto, FIG. 3c shows a decrease of flange 14 width in the same direction (i.e. an increase in opposite direction). The lower part of FIG. 3a shows that (the projection of) the flange end sides, when viewed from above, can be put under an angle with respect to each other if desired. FIG. 3d shows a cross-section of the V-shaped flow deflection member 12. The acute angle of the flanges 14, i.e. the angle between the 'legs' of the V-shape, preferably lies within the range of 80°-160°, more preferably is around 120°.

Thus, the invention has been described by reference to the embodiment discussed above. It will be recognized that this embodiment is susceptible to various modifications and alternative forms well known to those of skill in the art without departing from the spirit and scope of the invention. Accordingly, although a specific embodiment has been described, this is an example only and is not limiting upon the scope of the invention.

REFERENCE NUMERALS

1. Internally fed drum filter
2. Inlet duct
3. Flow distribution arrangement
4. Brush
5. Drive motor
6. Filtered waste water discharge
7. Solid substance discharge
8. Support frame
9. (Drum)
10. Helicoid
11. Outflow opening
12. V-shaped flow deflection member
13. Sharp edge
14. Flange
15. Actuator rod
16. Hinge
17. Water collection tray
18. Separation wall
19. Rod support

The invention claimed is:

1. An internally fed drum filter for treating waste water, comprising:
an inlet distribution arrangement for distributing waste water entering the drum filter via an inlet duct, the inlet distribution arrangement comprising a flow deflection member arranged near an outflow opening of the inlet duct, downstream thereof, for adjusting the flow characteristics of waste water entering the drum filter via the inlet duct,
wherein the flow deflection member is connected to an underside of the inlet duct by a hinge that allows rotation of the flow deflection member from and towards the outflow opening of the inlet duct, the flow deflection member having a flow deflection surface for deflecting an incoming flow from the inlet, the flow deflection surface extending upwardly from below a lower edge of the outflow opening of the inlet duct, and
wherein the flow deflection member is upwardly inclined, and wherein an angle of the upwardly inclined flow deflection member with respect to a centre line of the inlet duct is adjustable within a range of 5°-50° by rotation of the flow deflection member.

2. The drum filter according to claim 1, wherein an orientation and/or position of the flow deflection member is adjustable so that an incoming flow is essentially divided into two flows directed at sides of the drum filter.

3. The drum filter according to claim 1, wherein the flow deflection surface is bent or curved in a plane perpendicular to a longitudinal direction of the flow deflection member, wherein a convex side of the bent or curved flow deflection surface is facing the outflow opening.

4. The drum filter according to claim 1, wherein the flow deflection member is a plate.

5. The drum filter according to claim 1, wherein the flow deflection member has a V-shaped cross-section resulting in the flow deflection member to have a sharp edge and two flanges connecting in the sharp edge, wherein the sharp edge of the V-shaped section substantially faces the outflow opening.

6. The drum filter according to claim 1, wherein adjustment of the flow deflection member can be achieved by moving one or more actuators connected to the flow deflection member, wherein the one or more actuators can be activated by being connected to an outside actuator situated outside an inlet end of the drum filter.

7. The drum filter according to claim 6, wherein the one or more actuators are substantially arranged close to an underside of the inlet duct and extend parallel thereto.

8. The drum filter according to claim 6, wherein the one or more actuators comprise a rod and/or a thread.

9. The drum filter according to claim 5, wherein an angle of the flanges of the V-shaped flow deflection member is 80°-160°.

10. The drum filter according to claim 5, wherein said V-shaped flow deflection member has a length, wherein a width of the flanges of the V-shaped flow deflection member increases along said length.

11. The drum filter according to claim 7, wherein the one or more actuators comprise a rod and/or a thread.

12. The drum filter according to claim 6, wherein the flow deflection member has a V-shaped cross-section resulting in the flow deflection member to have a sharp edge and two flanges connecting in the sharp edge, wherein the sharp edge of the V-shaped section substantially faces the outflow opening, wherein an angle between the flanges of the V-shaped flow deflection member is 80°-160°.

13. The drum filter according to claim 6, wherein the flow deflection member has a V-shape and a flange width of the V-shaped flow deflection member increases along a length thereof.

14. The drum filter according to claim 5, wherein an angle of the flanges of the V-shaped flow deflection member is around 120°.

15. The drum filter according to claim 6, wherein the flow deflection member has a V-shaped cross-section resulting in the flow deflection member to have a sharp edge and two flanges connecting in the sharp edge, wherein the sharp edge of the V-shaped section substantially faces the outflow opening, wherein an angle between the flanges of the V-shaped flow deflection member is around 120°.

16. An internally fed drum filter for treating waste water, comprising:
an inlet duct;
an outflow opening of the inlet duct;
an upwardly inclined flow deflection member arranged near the outflow opening, for adjusting the flow characteristics of waste water entering the drum filter via the inlet duct, an angle of the upwardly inclined flow deflection member with respect to a centre line of the inlet duct is adjustable within a range of 5°-50° by rotation of the flow deflection member;
a hinge that allows rotation of the upwardly inclined flow deflection member, the hinge connecting the flow deflection member to an underside of the inlet duct so as to allow rotation of the flow deflection member from and towards the outflow opening of the inlet duct, the flow deflection member having a flow deflection surface for deflecting an incoming flow from the inlet, the flow deflection surface extending upwardly from below a lower edge of the outflow opening of the inlet duct; and
an activator connected to the upwardly inclined flow deflection member, the activator comprising a rod that projects through a separation wall.

17. The drum filter according to claim 16, wherein the activator automatically adjusts the angle of the upwardly inclined flow deflection member based on water level in the drum filter.

* * * * *